United States Patent
Liobe et al.

(10) Patent No.: US 10,955,551 B2
(45) Date of Patent: Mar. 23, 2021

(54) PIXEL OUTPUT PROCESSING CIRCUIT WITH LASER RANGE FINDING (LRF) CAPABILITY

(71) Applicant: Sensors Unlimited, Inc., Princeton, NJ (US)

(72) Inventors: John Liobe, New York, NY (US); Joshua Lund, Dallas, TX (US)

(73) Assignee: Sensors Unlimited, Inc., Princeton, NJ (US)

( * ) Notice: Subject to any disclaimer, the term of this patent is extended or adjusted under 35 U.S.C. 154(b) by 746 days.

(21) Appl. No.: 15/785,069

(22) Filed: Oct. 16, 2017

(65) Prior Publication Data
US 2019/0113623 A1   Apr. 18, 2019

(51) Int. Cl.
| G01C 3/08 | (2006.01) |
| G01S 17/08 | (2006.01) |
| G01S 7/481 | (2006.01) |
| G01S 7/4863 | (2020.01) |
| G01S 17/10 | (2020.01) |

(52) U.S. Cl.
CPC ............ *G01S 17/08* (2013.01); *G01S 7/4816* (2013.01); *G01S 7/4863* (2013.01); *G01S 17/10* (2013.01)

(58) Field of Classification Search
CPC ...... G01S 17/10; G01S 17/08; G01S 17/4863; G01S 17/4816; G01S 7/4863; G01S 7/4816
USPC ....................................................... 356/5.01
See application file for complete search history.

(56) References Cited

U.S. PATENT DOCUMENTS

| 2,945,915 A | 7/1960 | Split |
| 7,206,251 B1 | 4/2007 | Yu |

(Continued)

FOREIGN PATENT DOCUMENTS

| EP | 2582131 | 4/2013 |
| JP | 2008047125 | 2/2008 |

(Continued)

OTHER PUBLICATIONS

Langof, Lidia, et al., "Advanced multi-function infrared detector and on-chip processing," SemiConductor Devices, P.O. Box 2250, Haifa 31021, Israel; Elbit Systems, Electro-Optics El-Op Ltd. P.O. Box1165, Rehovot 76111, Israel; Israeli Ministry of Defence (IMOD), Israel; Proc. SPIE 8012, Infrared Technology and Applications XXXVII, 80120F (May 21, 2011); doi: 10.1117/12.883248.

(Continued)

*Primary Examiner* — Mark Hellner
(74) *Attorney, Agent, or Firm* — Locke Lord LLP; Scott D. Wofsy; Judy R. Naamat (57) ABSTRACT

A pixel output processing circuit of a focal plane array (FPA) having a plurality of laser range finding pixels (LRF) is provided. The respective LRF pixels output a high frequency analog signal in response to sensing a reflected laser pulse. The pixel output processing circuit includes a common net and a detection circuit. The common net is connected to a amplifying transistor of each of the LRF pixels for receiving analog signals output from the respective LRF pixels. The detection circuit is coupled to the common net and outputs a pulse flag in response to detecting that a high frequency analog signal has been received by the common net.

23 Claims, 4 Drawing Sheets

(56) References Cited

U.S. PATENT DOCUMENTS

| | | | |
|---|---|---|---|
| 8,168,934 B2* | 5/2012 | Niclass | G01T 1/248 250/214 R |
| 8,736,684 B1 | 5/2014 | Johansson et al. | |
| 8,922,544 B2 | 12/2014 | Chaji et al. | |
| 9,641,781 B2 | 5/2017 | Lin et al. | |
| 2003/0107658 A1 | 6/2003 | Huang et al. | |
| 2004/0113046 A1 | 6/2004 | Gorder et al. | |
| 2004/0227828 A1 | 11/2004 | Loose | |
| 2006/0202129 A1* | 9/2006 | Niclass | G01S 7/4863 250/370.14 |
| 2007/0236480 A1 | 10/2007 | Sullivan et al. | |
| 2009/0076751 A1 | 3/2009 | Li et al. | |
| 2012/0176357 A1 | 7/2012 | Katoh et al. | |
| 2012/0318963 A1 | 12/2012 | Van Blerkom | |
| 2013/0162602 A1 | 6/2013 | Nakagawa et al. | |
| 2013/0297248 A1 | 11/2013 | Dawson et al. | |
| 2014/0002632 A1 | 1/2014 | Lin | |
| 2014/0306921 A1 | 10/2014 | Ningrat | |
| 2015/0026506 A1 | 1/2015 | Lee et al. | |
| 2015/0268792 A1 | 9/2015 | Hamaguchi et al. | |
| 2015/0285625 A1 | 10/2015 | Deane | |
| 2016/0057366 A1 | 2/2016 | Lee et al. | |
| 2016/0295148 A1 | 10/2016 | Lin et al. | |
| 2018/0041727 A1 | 2/2018 | Lund et al. | |

FOREIGN PATENT DOCUMENTS

| | | |
|---|---|---|
| JP | 2008060621 | 3/2008 |
| KR | 100697238 | 3/2007 |
| KR | 20120138304 | 12/2012 |
| WO | WO-2004019396 | 8/2003 |
| WO | WO-2009031303 | 12/2010 |

OTHER PUBLICATIONS

Mooney, J.M., et al., "Point target detection in consecutive frame staring infrared imagery with evolving cloud clutter," Optical Engineering, 34(9), (1995). doi:10.1117/12.210757, Sep. 1, 1995.

French Search Report issued in corresponding French Patent Application No. 1859556 dated Nov. 6, 2020. (9 pages).

* cited by examiner

PIXEL OUTPUT PROCESSING CIRCUIT WITH LASER RANGE FINDING (LRF) CAPABILITY

BACKGROUND OF THE DISCLOSURE

1. Field of the Invention

The present disclosure relates to a focal plane array, and more particularly to a pixel output processing circuit with laser range finding (LRF) capability.

2. Description of Related Art

A focal plane array (FPA) can include an array of pixels that receives laser pulses reflected from a target. The FPA can perform laser range finding (LRF) operations to determine a distance from a laser source co-located near the FPA to an object targeted by a laser pulse output by the laser source. The distance is determined by measuring the time-of-flight (TOF) of a laser pulse from the laser source to the target and back again. LRF techniques can determine the distance to the target.

A conventional pixel capable of LRF determines time-of-arrival (TOA) of a detected reflected laser pulse by performing a comparison in the pixel and storing an analog or digital value in the pixel representative of the TOA. In a conventional digital implementation, output of the comparator latches a digital counter value, which is stored in memory in the pixel and readout later by a readout circuit. In a conventional analog implementation, the output of the comparator latches an analog ramp value onto a local capacitor of the pixel that is readout later by a readout circuit. The conventional implementation uses components, such as a high bandwidth amplifier, a comparator, and/or a storage device that are included in the pixel.

While conventional methods and systems have generally been considered satisfactory for their intended purpose, there is still a need in the art for a pixel output processing circuit that is external to the pixel and has LRF capabilities. The present disclosure provides a solution for this problem.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a pixel output processing circuit of a focal plane array (FPA) having a plurality of laser range finding pixels (LRF) is provided. The respective LRF pixels output a high frequency analog signal in response to sensing a reflected laser pulse. The pixel output processing circuit includes a common net and a detection circuit. The common net is connected to a amplifying transistor of each of the LRF pixels for receiving analog signals output from the respective LRF pixels. The detection circuit is coupled to the common net and outputs a pulse flag in response to detecting that a high frequency analog signal has been received by the common net.

In embodiments, the pixel output processing circuit further includes a synchronization circuit that synchronizes the pulse flag with at least one of emission of a known timing signal and a laser pulse from a laser source. In embodiments, the detection circuit includes at least one of a comparator and an amplifier. In embodiments the comparator compares a voltage associated with the common net to a voltage associated with a reference net.

Additionally, in embodiments, the entire detection circuit is external to each of the pixels. In embodiments, each of the LRF pixels is included in a first subset of pixels of the FPA, and pixels of a second subset of pixels of the FPA are not coupled to the pixel output processing circuit.

In embodiments, the detection circuit includes at least one of a comparator and a sense amplifier.

In addition, in embodiments, the detection circuit includes at least one voltage-mode sense amplifier. In embodiments the at least one voltage-mode sense amplifier compares a voltage associated with the common net to a voltage associated with a reference net. In embodiments the amplifying transistors are coupled to the voltage-mode sense amplifier as at least one of pullup or pulldown devices.

Furthermore, in embodiments the synchronization circuit includes a counting device that begins counting in response to notification of emission of the laser pulse from the laser source and a counter latch that saves a count value indicative of counting by the counter in response to notification of output of the pulse flag.

In embodiments the a time interval between sensing the reflected laser pulse by one of the LRF pixels and outputting the pulse flag is less than 10 ns. In embodiments a time interval between sensing the reflected laser pulse by one of the LRF pixels and outputting the pulse flag is less than 5 ns. In embodiments a time interval between sensing the reflected laser pulse by one of the LRF pixels and outputting the pulse flag is less than 2 ns.

In embodiments, timing of outputting the pulse flag is proportional to a distance between the FPA and an object off which the laser pulse sensed by the LRF pixels signal was reflected.

In accordance with other aspects of the disclosure an FPA is provided that includes an array of the laser range finding (LRF) pixels and the pixel output processing circuit.

In accordance with further aspects of the disclosure, an LRF apparatus is disclosed that includes a laser source, an FPA having an array of the LRF pixels, and the pixel output processing circuit.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
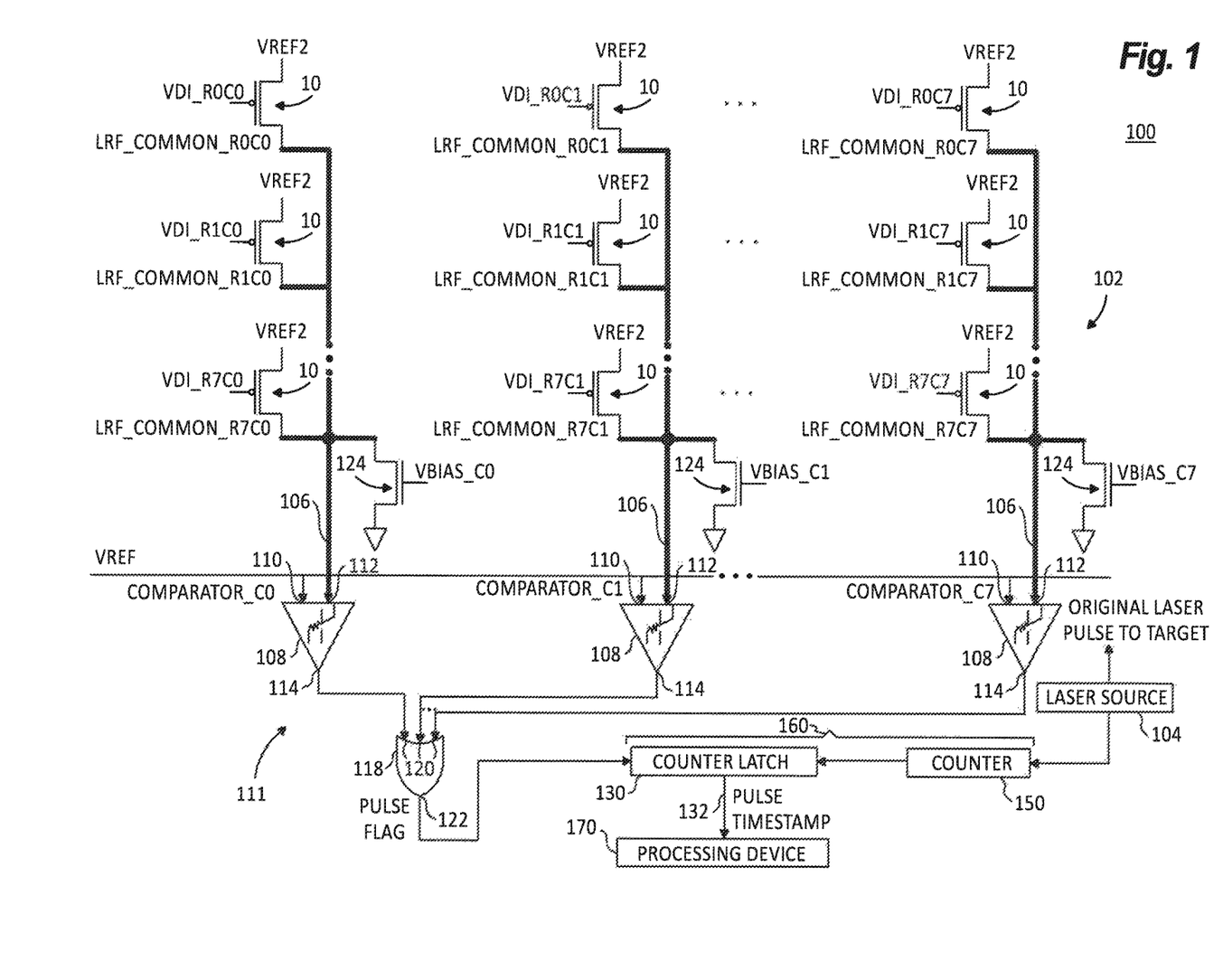
FIG. 1 shows a schematic diagram of an example embodiment of a pixel output processing circuit for an array of pixels with laser range finding (LRF) capability in accordance with embodiments of the present disclosure.

Reference will now be made to the drawings wherein like reference numerals identify similar structural features or aspects of the subject disclosure. For purposes of explanation and illustration, and not limitation, a schematic diagram of an exemplary embodiment of a pixel output processing circuit connected to an array of laser range finding (LRF) pixels of a focal plane array (FPA) in accordance with the disclosure is shown in FIG. 1 and is designated generally by reference character 100. Other embodiments of a pixel output processing circuit in accordance with the disclosure, or aspects thereof, are provided in FIGS. 2-4, as will be described.

As described in greater detail below, the pixel output processing circuit 100 can be included in a focal plane (FPA) array that includes an array of pixels. The pixel output processing circuit 100 can process signals output from an array of LRF pixels. The array of LRF pixels can be the entire array of pixels of the FPA or a subarray of the array of pixels of the FPA. The array of LRF pixels are connected to the pixel output processing circuit 100 by amplifying transistors 10 of the respective pixels. The amplifying transistors 10 are configured in a amplifying transistor array 102 that corresponds to configuration of the array of LRF pixels. In the embodiment shown, the amplifying transistor array 102 is an 8×8 array having rows R0-R7 and columns C0-C7, however the size of the array is not limited to the example shown.

An LRF pixel is defined as a pixel that has a laser range finding (LRF) capability. To be considered to have LRF capability, such a pixel is able to receive a short duration (nanoseconds to tens of nanoseconds) photocurrent impulse at its input and provide a voltage response at its output within 10 ns of the input pulsed photocurrent event. Each amplifying transistor 10 of amplifying transistor array 102 corresponds to one LRF pixel. The amplifying transistors 10 induce an output voltage swing on output signal LRF_common, indicating when the LRF pixel sensed a high frequency signal. The voltage swing on output signal LRF common is sensed by the pixel output processing circuit 100, where it is analyzed to determine time of arrival.

As described in further detail below, the pixel output processing circuit 100 can perform time of arrive detection and timestamp generation of the LRF output signal by one or more of the LRF pixels. The timestamp can be processed relative to a synchronized digital signal indicative of emission of an original laser pulse by a laser source 104 to determine a time-of-flight between emission of the original laser pulse signal and detection of a reflected laser pulse sensed by one or more of the LRF pixels. The laser source 104 is co-located with the FPA or is located at a fixed position relative to the FPA such that a known time-of-flight offset could be applied.

In embodiments, the FPA is a single mode FPA in which each of the pixels included in the array of pixels is a single mode LRF pixel. In embodiments, the FPA is a multimode FPA that can perform two or more functions of imaging, laser pulse detection, and LRF. The multimode FPA can include single and/or multimode pixels. A single mode pixel is configured to perform one operation of imaging, laser pulse detection, and LRF. A multimode pixel is configured to perform two or more operations of imaging, laser pulse detection, and LRF.

In an example application of a multimode FPA, the single mode FPA or multimode FPA can be included in an apparatus, such as a camera used for laser range finding and optionally imaging associated with laser pulses emitted by military laser designators and reflected from targets, such as near infrared (NIR), short-wavelength infrared (SWIR), mid-wavelength infrared (MWIR), long-wavelength infrared (LWIR). Other applications for cameras that acquire images and perform range finding for short duration, high frequency light impulses are also envisioned.

The camera can be, for example, a SWIR camera that can be used to detect and timestamp the time of arrival of reflected laser signals, which are commonly of a wavelength visible in the shortwave infrared band. Alternatively, the LRF pixel can also be used to detect and timestamp reflected laser pulses of a non-SWIR wavelength or emitted by other emitters of high frequency pulse energy with short pulse durations, such as ultraviolet, visible, or midwave pulses or pulses of other received electromagnetic signals, such as x-rays.

Since the reflected laser signals can have a wavelength visible in the shortwave infrared band with pulses having widths on the order of nanoseconds to tens of nanoseconds, pixel output processing circuit 100 uses a high temporal resolution of a few nanoseconds that is sufficient to detect and timestamp the reflected laser pulses.

In the example shown, the pixel output processing circuit 100 includes one common net 106 for each column of columns C0-C7. Each common net 106 receives a signal LF_Common_Cj (for $j \leq 0 \leq 7$) from each of the amplifying transistors 10 in the column Cj.

In the example shown, internal to the LRF pixels, a gate input VDI_RiCj (for $0 \leq i \leq 7$ and $0 \leq i \leq 7$) is applied to the gate of each amplifying transistor 10 at position RiCj in the transistor array 102, wherein Ri indicates the row and Cj indicates the column. In the example shown, one common net 106 is provided for each column. The common net 106 for each column is coupled with the amplifying transistor 10 of each amplifying transistor 10 in the column, forming a common net for the LRF_common_Cj signals output by the amplifying transistors 10 in column Cj.

Each common net 106 is depicted by bold lines, where the bold graphics are for illustrative purposes to show interconnects (e.g., a wires or traces) that are electrically connected and form the common net, rather than to indicate a structural difference relative to other interconnects. Each common net 106 includes the interconnects that are commonly connected between circuit elements shown. The common net 106 of each column is also coupled to a bias/reset transistor 124. Each bias/reset transistor 124 operates to provide steady state current bias to the associated common net 106 to which it is coupled or to periodically reset the associated common net 106 in preparation for a LRF signal detection operation.

At any moment, if one or more LRF_common_Cj signals output to the common net 106 of one of the columns Cj are HIGH, the LRF_common_Cj signal transmitted along that column is HIGH, otherwise the signal is LOW. At any moment, one or more VDI_RiCj signals can experience a voltage delta in response to a photocurrent pulse in one or more of the LRF pixels. The voltage delta on one or more VDI_RiCj signals will act, through the amplifying transistor 10, to generate a voltage delta on the associated LRF_common_Cj, common net 106. The column signals LRF_common_Cj may be subsequently processed by the downstream LRF circuit to detect a time of arrive and generate a timestamp. In the example shown, bias transistor 124 is shown, connecting to each column common net 106. The bias transistor 124 serves to provide a small bias current or load, completing an amplifier formed by the amplifying transistors 10 and the bias transistor 124. Alternatively or additionally, the bias transistor 124 may be operated in a digital manner and serve as a reset device. In this configuration, the gate of the bias transistors VBIAS_Cj, would be pulsed before the expected arrival of a pulsed laser event, resetting the common nets 106 to a known reset voltage.

In the example shown, a comparator 108 is provided for each column Cj. Each comparator 108 has a first input terminal 110, a second input terminal 112, and an output terminal 114. A voltage level of a signal output from the output terminal 114 indicates the occurrence of a sufficient differential between voltages of signals input to the first input terminal 110 and the second input terminal 112.

For each comparator 108, the common net 106 that corresponds to the column of the comparator 108 is provided to the first input terminal 110 of the comparator 108. A reference signal VREF is provided to the second input terminal 112. If the signal provided to the first input terminal 110 sufficiently exceeds the threshold signal applied to the second terminal 112, a signal output from the output terminal 114 is HIGH, otherwise the signal output from the output terminal 114 is LOW. Accordingly, at any moment, if the signal provided by the column is HIGH due to a HIGH signal provided by any of the LRF_common_Cj signals output to the common net 106, the output from the comparator 108 is HIGH, otherwise the output from the comparator 108 is LOW.

The comparator 108 may be implemented as any differential or single-ended amplifier capable of discerning a small voltage delta, with a detection delay of no more than 10 ns, and generating at its output, in response to the detection, a voltage swing sufficient to be considered as a logic 1, HIGH, or logic 0, LOW.

The output terminal 114 of each comparator 108 is coupled to an input terminal 120 of an OR circuit 118. A respective input terminal 120 is provided for the output of each comparator 108. The OR circuit 118 applies an OR function to the signals provided at each of its input terminals 120. Accordingly, if the output from any or all of the comparators 108 is HIGH, the OR circuit 118 outputs a pulse flag signal from its output terminal 122. Output of a pulse flag indicates that a reflected laser pulse has been detected.

The OR circuit will determine if any of the connected comparators 108 has asserted a HIGH, logic 1, value at its output. In an alternative configuration, an AND gate could be used to detect the presence of a logic 0, LOW, at the output of any of the connected comparators 108. In this configuration, the comparator 108 would be configured to assert a logic 1, HIGH, if an event was not detected and a logic 0, LOW, if an event was detected. In alternative example embodiments, a NOR gate or a NAND gate could be used to generate the pulse flag.

The pixel output processing circuit 100 is not limited to a particular configuration. For example, in embodiments, a different common net 106 is provided for each amplifying transistor 10. In embodiments, a different common net 106 is provided for a combination of amplifying transistors 10 that can include one or more rows, more than one column, or for a portion of one or more rows and/or columns. A single common net 106 can be provided for all of the amplifying transistors 10.

Similarly, in embodiments, a different comparator 108 is provided for each amplifying transistor 10. In embodiments, a different comparator 108 is provided for a combination of amplifying transistors 10 that can include one or more rows, more than one column, or for a portion of one or more rows and/or columns. A single comparator 108 can be provided for all of the amplifying transistors 10. In the example shown, the amplifying transistors 10 are disposed within each LRF pixel and connect to the common nets 106 that are external to the LRF pixels of the LRF array. The comparators 108 and OR circuit(s) 118 are disposed external to the LRF pixels of the LRF array. The signals VDI_RiCj and a reference signal, VREF2, are applied to the amplifying transistors 10 internally within each of the corresponding LRF pixels.

VDI_RiCj represents a voltage internal to an LRF pixel that experiences a voltage delta in response to a short duration photocurrent impulse at the pixel input. VREF2 represents a biasing voltage supply applied to the source of amplifying transistor 106. The difference between the steady state VDI_RiCj voltages and VREF2 affects the amplifying characteristics of the amplifying transistors as well as the response time from a delta on VDI_RiCj to a pulse flag indication at output terminal 122.

An advantageous feature of the pixel output processing circuit 100 is that, in embodiments, the output signal LRF-_common_Cj is an analog signal output from each of the amplifying transistors 10 signal and provided directly to the common net 106 for column Cj. The analog signals are processed by the comparator 108 designated for column Cj and the OR circuit 118, wherein the comparator 108 and the OR circuit 118 are external to the corresponding LRF pixel, minimizing the quantity and size of components included in the LRF pixels.

The pixel output processing circuit 100 further synchronizes pulse flag signals output by the OR circuit 118 that are indicative of detection of a reflected laser pulse by any of the LRF pixels with the transmission of the original laser pulse output by the laser source 104. The pixel output processing circuit 100 outputs a digital timestamp of the time the reflected laser pulse was detected by the LRF pixel(s), wherein the timestamp is synchronized with the emission of the original laser pulse. The timestamp indicates a time-of-flight of the laser pulse. The time-of-flight includes the time from transmission by the laser source 104 until generation of the pulse flag. A processing device 170 can process the time-of-flight to determine a distance from the laser source 104 to the target.

This synchronization can be accomplished, for example, by a synchronization circuit 160. The synchronization circuit 160 can include a counter latch 130 and a counter 150. The counter 150 counts when it receives a counter clock by incrementing a counter value at regular time intervals. In this way, the counter value represents the passage of time. The counter 150 can be free-running or can be reset after each readout of the counter latch 130. The counter latch 130 can be, for example, a register or memory element that latches (i.e., stores) the counter value at a particular time. The counter latch 130 can be readout to a processing device or user for additional processing.

The laser source 104 can transmit a counter reset to the counter 150 at a known time relative to the time that the laser source 104 emits an original laser pulse toward a target. The counter 150 will then increment and count in response to a counter clock. Upon receiving the pulse flag, the current value of the counter value is latched in the counter latch 130 as a time-of-arrival value, or pulse timestamp. Alternatively, if a counter reset signal from a laser source is not available, the counter value can be reset (e.g., initialized to zero) in response to an alternative synchronization signal, e.g., an imaging frame timing signal. Additionally, upon receiving the counter reset, the counter 150 begins counting.

Upon output of a pulse flag by the OR circuit 118, the current counter value is latched as a timestamp in the counter latch 130 as a detection-time value. If the counter value was reset in response to a laser source pulse emission timing signal, the timestamp represents the time-of-flight and can be used to determine a distance from the laser source 104 to the target. If the counter value was reset in response to an alternative synchronization signal, the timestamp represents a time-of-arrival. The pixel output processing circuit 100 is not limited to a particular configuration of the counter 150 or source of the counter value reset.

The temporal resolution of pixel output processing circuit 100 is based on the temporal resolution of the LRF mode active pixel and the temporal resolution of the comparator 108, the OR circuit 118, the counter latch 130, and the counter 150, which can be affected by signal-to-noise resolution (SNR) of these components and clock jitter associated with the counter 150. Of note, the temporal resolution of the pixel output processing circuit 100 is independent of the range detection limit of the pixel output processing circuit 100, such that there is not a tradeoff between range and temporal resolution.

In embodiments, the time interval between sensing the reflected laser pulse by one of the LRF mode active pixels and outputting the pulse flag is less than 10 ns. In embodiments, the time interval between sensing the reflected laser pulse by one of the LRF mode active pixels and outputting the pulse flag is less than 5 ns. In embodiments, the time interval between sensing the reflected laser pulse by one of the LRF mode active pixels and outputting the pulse flag is less than 2 ns. Since a 6 ns time resolution equates to about a one meter range resolution for determining distance between the laser source and the target, a temporal resolution of 10 ns can be adequate for a relatively long distance applications, such as 1000 m+/−2 m, whereas a temporal resolution of 5 ns or 2 ns can be adequate for shorter distances or smaller tolerances, such as 1000 m+/−1 m or 500 m+/−0.5 m, respectively.

Figure 2:
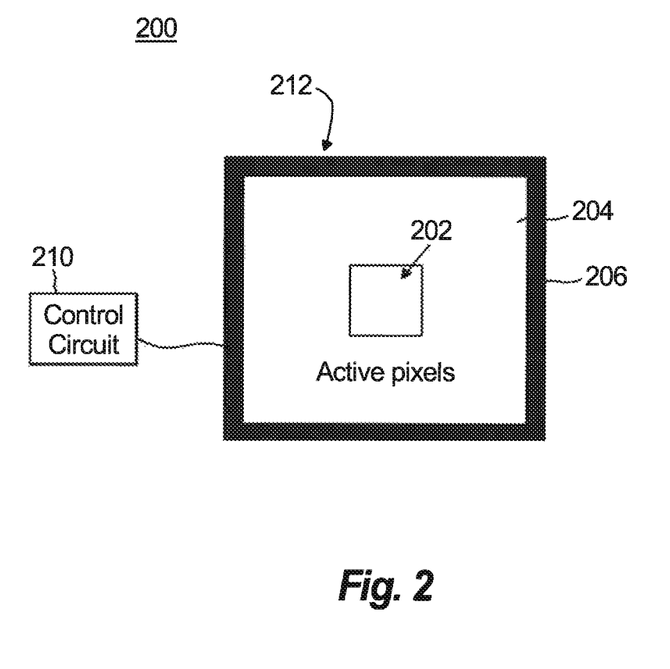
FIG. 2 shows a schematic diagram of an example embodiment of an FPA that includes pixels with LRF capabilities in accordance with embodiments of the present disclosure.

FIG. 2 shows an FPA 200 that includes an array of pixels, wherein the array of pixels can include subarrays, such as a first subarray of LRF mode active pixels 202; a second subarray of non-LRF mode active pixels 204, wherein the second subarray includes the first subarray; and a third subarray 206. An array of active pixels 212 thus includes the LRF mode and non-LRF mode active pixels 202, 204. An FPA control circuit 210 can be coupled to the active pixels 204 for selecting the bias applied to the LRF mode pixels and the non-LRF mode pixels. The pixel output processing circuit 100 shown in FIG. 1 can be coupled to the LRF mode active pixels 202.

The LRF mode active pixels 202 are pixels that operate in LRF mode, such as due to inclusion of components and/or circuitry and/or receive a bias signal that facilitate the LRF capability. For example, as described in copending U.S. Patent Application entitled MULTIMODE ROIC PIXEL WITH LASER RANGE FINDING (LRF) CAPABILITY, filed concurrently with this patent application and which is incorporated herein in its entirety, components included in the LRF mode pixels that facilitates the LRF capability can include a bias line for biasing the input buffer, a amplifying transistor for passing the output of a high frequency signal that travels along a high frequency path, and an output line for outputting signals from a amplifying transistor external to the FPA mode active pixel.

The non-LRF mode active pixels 204 do not operate in the LRF mode, for example, since they do not include components and/or circuitry and/or receive a bias signal to facilitate an LRF capability. In embodiments, the LRF mode active pixels 202 and the non-LRF mode active pixels 204 can have the same architecture, whereas it is the bias signal received by the pixels that determines whether the pixels are LRF mode active pixels 202 or non-LRF mode active pixels 204.

The size and positioning of the subarray of active LRF mode pixels 202 can be determined based on several factors, such as pixel pitch, pixel sensitivity, pixel bandwidth, and laser source energy. In embodiments, based on expected reflected laser spot size and energy of an intended usage case, the subarray of active LRF mode pixels 202 can be an array of 8×8 multimode LRF pixels 100, without limitation to a particular size. Additionally, the subarray of active LRF mode pixels 202 can be disposed at the center of the array of active pixels 212, without limitation to this arrangement.

A third array of reference pixels 206 of the fourth subarray can be used to provide reference inputs to a pixel output processing circuit of the FPA 200, such as sense amplifier (SA) 300 shown in FIG. 3, and described in greater detail below. The reference pixels 206 can be disposed about the periphery of the FPA 200 surrounding the active pixel arrays outside of the active imaging area, but is not limited to a particular configuration. The reference pixels 206 can be optically black reference pixels, meaning they do not sense an optical signal, which is also referred to as quiet pixels or dark pixels. Each reference pixel 206 can have the same structure as the LRF mode active pixels 502, but be configured as optically black, e.g., covered by metal or some other material to block the incident light from reaching the pixel's circuitry, so that it does not "see" any optical signal. Output from the reference pixels 206 can be provided as reference signals to an SA of a pixel output processing circuit, such as SA 300 shown in FIG. 3.

Figure 3:
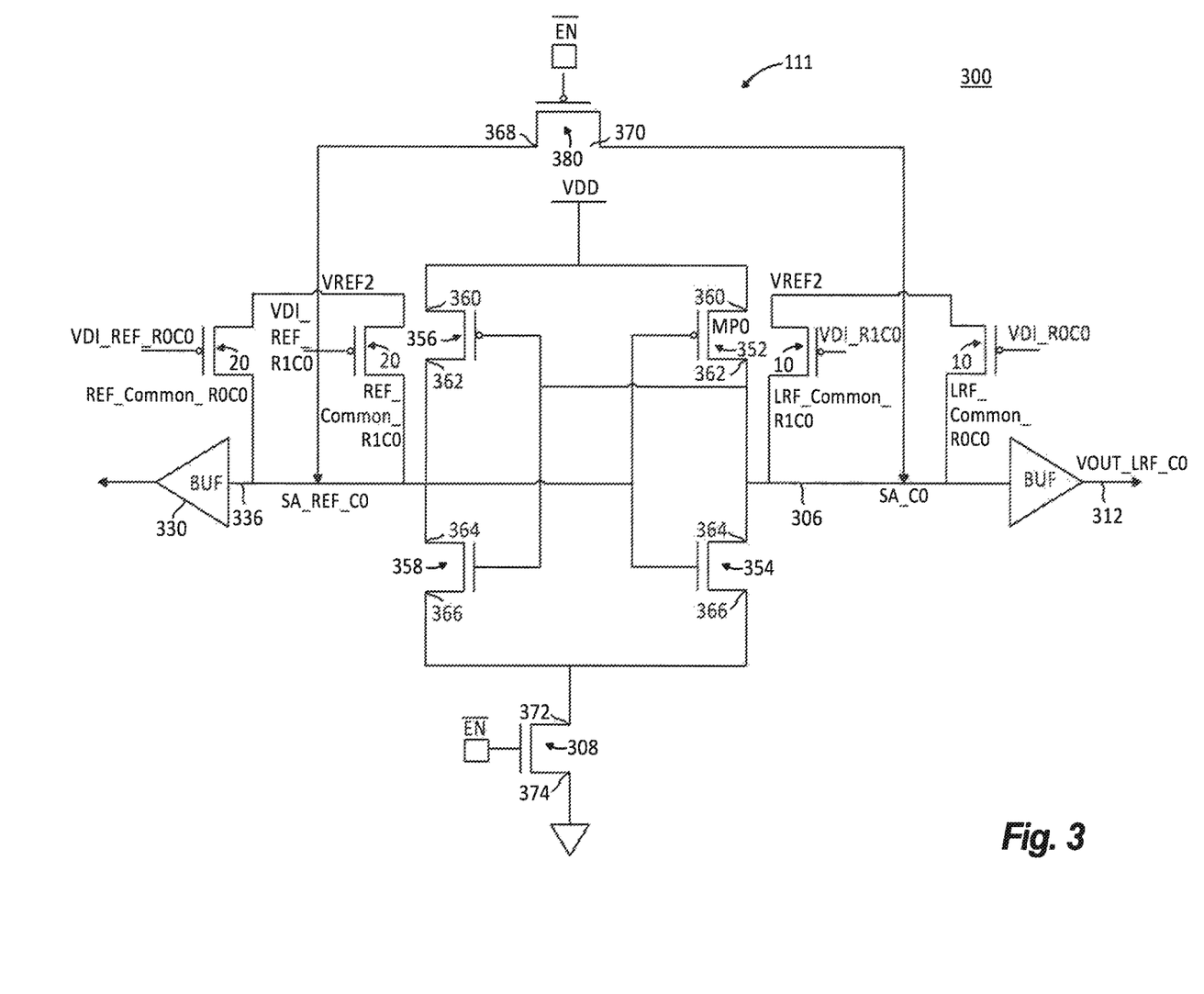
FIG. 3 shows a schematic diagram of an example sense amplifier for processing output of LRF pixels connected to the sense amplifier in in accordance with embodiments of the present disclosure.
Figure 4:
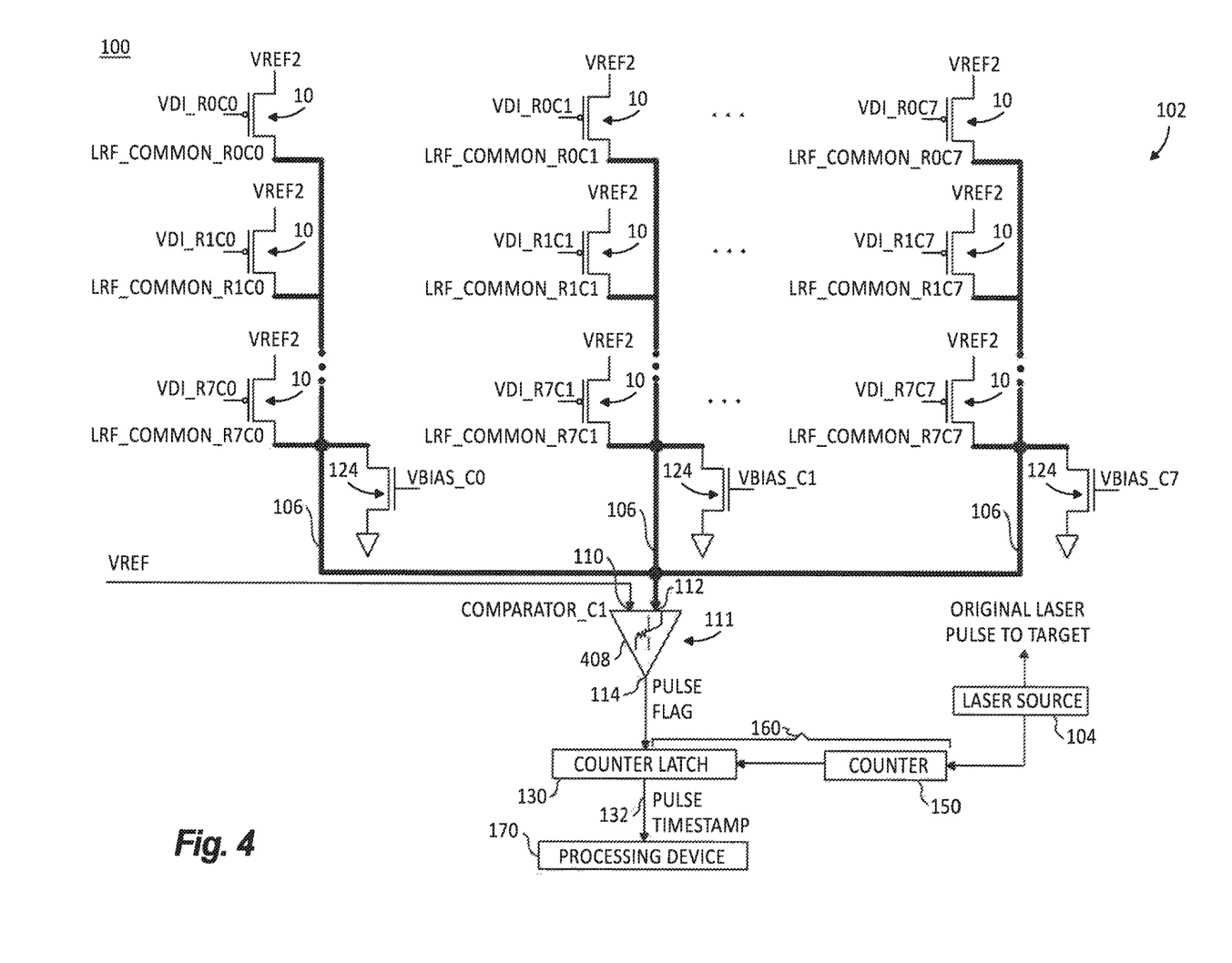
FIG. 4 shows another example embodiment of a pixel output processing circuit for an array of pixels with LRF capabilities in accordance with embodiments of the present disclosure.

With reference to FIG. 4 a schematic diagram of an embodiment of a voltage-mode SA 400 that functions as a pixel output processing circuit comparator for a selected column (in the present example column 0) of an 8×8 array of LRF pixels is shown, such as the subarray of active LRF mode pixels 302 shown in FIG. 3. In embodiments, instead of a voltage-mode SA, the SA could be configured as a current mode SA, with appropriate modifications to the column circuits, including elimination of the bias transistor 124. The SA 300 is connected to one or more LRF pixels of column 0 of the array. In embodiments, the connected column can include a portion of, or an entire column of any of one or more columns of an array of LRF pixels, wherein the array is not limited to a particular size.

The SA 300 is further connected to two or more reference LRF pixels, wherein each of the two or more LRF pixels has a corresponding reference LRF pixel to balance the input load to the SA 300. The reference pixels, the LRF pixels, and the SA 300 create a self-referenced comparator in which the output from the reference pixels serves as a threshold voltage to which the voltage output from the LRF pixels are compared. In particular, the SA 300 compares outputs from the two or more LRF pixels and the corresponding reference LRF pixels for detecting a pulse sensed by any of the LRF pixels. The SA 300 outputs a signal VOUT_LRF_C0 (wherein C0 indicates column 0) that has a level (e.g., voltage or current level) that changes when a laser pulse is detected, wherein the time of the change in level can be synchronized with output of an original laser pulse, as described with respect to the synchronization circuit 160 shown in FIG. 1.

In embodiments, the SA 300's reference input terminal 336 can connect to an alternative reference voltage VREF instead of reference LRF pixels 20. The alternative reference voltage VREF can be generated by any of several means, including a digital-to-analog converter (DAC), an external voltage supply, or an alternative voltage reference generation circuit designed to output a voltage near the DC steady state output voltage of an LRF pixel.

The SA 300 amplifying function is implemented with a differential amplifier which includes a plurality of transistors, including transistors 352, 354, 356, 358, and 308. The input/output terminal 306 is connected to a buffer 310 and provides a signal SA_C0 (wherein C0 indicates column 0) to the buffer 310. The buffer 310 outputs an output signal VOUT_LRF_C0 for the selected column. The reference input/output terminal 336 is connected to a reference buffer 330 and provides a signal SA_REF_C0 to the buffer 330. The buffers 310, 330, can be, for example, an amplifier of an invertor.

The SA 300 further includes a current bias device 308 and an equalizing transistor 380. The current bias device 308 can be an NMOS transistor, for example, that serves as a constant current source for the SA 300. The current bias device 308 can include a single device, e.g., NMOS transistor. In alternative embodiments, amplifier transistors 352, 354, 356, 358 can be implemented as NMOS transistors and current bias device 308 can be implemented as an PMOS transistor. Equalizer transistor 380 equalizes voltages provided on the input/output terminal 306 and the input/output reference terminal 336 before the SA 300 is enabled in order to improve accuracy of a comparison between outputs from the LRF pixels and the reference LRF pixels for detecting a pulse and outputting VOUT_LRF_C0 having a level indicative of pulse detection.

The components of the SA 300, namely the differential amplifier circuit, the equalizer transistor 380, and buffer circuits 310 and 330 are external to the two or more LRF pixels in column 0 and to the corresponding reference pixels. Accordingly, the number of components included in the LRF pixels, the footprint of such components, and the power consumption of the LRF pixels can be minimized.

The two or more amplifying transistors 10 of column 0 form a pullup portion of a wired OR circuit, the pull-up portion being formed of amplifying transistors 10 and bias transistor 124. Each such pull-up portion of the wired OR circuit is can be connected to the input/output terminal 306 (wherein the bias transistor 124 of the pull-up portion of the wired-OR circuit is not shown in FIG. 3). In this configuration, a laser pulse event detected in any pixel on column 0 causes a voltage delta at the input/output terminal 306 of the SA 303. In the example shown, the analog outputs from each of the two or more amplifying transistors 10, including LRF_common_RiC0, (for rows Ri, wherein r=two or more values between [0,7]), are connected, as an input to SA 300, to the input/output terminal 306.

Similarly, the two or more reference amplifying transistors 20 of column 0 form a pullup portion 3 of a reference wired OR circuit. Analog outputs from the two or more reference amplifying transistors 20 are ganged together, meaning the source or drain terminal of the reference amplifying transistor 20 are connected to the reference input/output terminal 336, forming a reference net. In the example shown, the outputs from each of the two or more reference amplifying transistors 20, including Ref_common_RiC0, (for rows r, r=two or more values between [0,7]), are connected, as an input to SA 300, via the reference input/output terminal 336.

Transistors 352, 356 each include a first terminal 360 and second terminal 362. The first terminal 360 is one of a source and drain terminal, and the second terminal 362 is the other of the source and drain terminals. Transistors 354, 358 each include a third terminal 364 and fourth terminal 366. The third terminal 364 is one of a source and drain terminal, and the fourth terminal 366 is the other of the source and drain terminals. The second terminal of transistor 356 is connected to the first terminal of transistor 358. The second terminal of transistor 356 is connected to the first terminal of transistor 358. The first terminals 360 of transistors 352 and 356 are each connected to respective source and drain terminals 368, 370 of the equalizer transistor 380. The fourth terminals 366 of transistors 354 and 358 are both connected to a terminal (source or drain) 372 of current bias device 308. The other terminal (source or drain) of current bias device 308 is connected to ground.

A signal ^EN that is complementary to signal EN is applied to gates of the equalizer transistor 380 and the current bias device 308. ^EN is controlled to turn on the current bias transistor 380 before a comparison to equalize the input/output terminal 306 and reference input/output terminal 336 and then turn off the current bias transistor 380 to allow for a comparison to occur.

Buffer 310 (which can be an amplifier or an inverter) is used to buffer the output signal SA_C0. The buffer 310 outputs VOUT_LRF_C0 from an output line 312 for column 0. The output of the SA 300, VOUT_LRF_C0, is triggered if the absolute magnitude of output of one of the LRF pixels is greater than that of the corresponding reference pixel.

In embodiments, the signal VOUT_LRF_C0 can be treated as a pulse flag. For example, depending on performance requirements, a single SA 300 can be used for an 8×8 array with inputs form 64 LRF pixels and 64 reference pixels, wherein the output of the SA 300 is treated as the pulse flag.

The pulse flag signal is thus output from the SA 300 when an output signal of one or more of the LRF pixels connected to the SA 300 is sufficiently different from an output signal of its corresponding reference pixel. The pulse flag signal can be treated as a binary or digital signal that can be further processed, such as for determining time-of-flight and distance to a target.

In embodiments, an SA 300 can be provided for each column or row, or for any subset of LRF pixels, regardless of arrangement. In this embodiment, the pulse flag can be generated by inputting VOUT_LRF_Cj (for column j, 0≤j≤7) generated for each of the columns Cj, to an OR circuit, such as the OR circuit 118 shown in FIG. 1. In this scenario, the pulse flag can be the signal output from the OR circuit.

In the example shown, in FIG. 3, although only two amplifying transistors 10 are shown, there can be, for example, an entire column (e.g., eight) amplifying transistors 10 and corresponding (e.g., eight) reference amplifying transistors 20 connected to SA 300, one amplifying transistor 10 and one reference amplifying transistor 20 for each row in column 0. In embodiments, SA 300 can be connected with amplifying transistors for pixels of any selected columns of the columns (0-7), including combinations of more than one column, which can include all of the columns. In embodiments, the two or more LRF pixels connected to the SA 300 can be from any combination of rows and columns of the array of LRF pixels.

In operation of the SA 300, in response to the analog output of the pullup (or pulldown, if configured as such) portion 302 being provided as an input to the SA 300, the common net, input/output terminal 306, which is connected to the source of all the amplifying transistors 10 of the column (column 0 in the example of FIG. 3), may be charged or discharged. It is understood that the common net can be connected to any grouping of amplifying transistors 10. A comparator or amplifier formed of transistors 308, 352, 354, 356, 358, and 380 monitors the common net, input/output terminal 306, for a response that is indicative of a high frequency signal having been detected on any of the LRF pixels connected to the common net, and creates a pulse flag, SA_C0 (or VOUT_LRF_C0). By comparing the common net to a reference common net, the SA 300 can determine when the analog output of any of the amplifying transistors 10 indicates detection of a high frequency signal. By this comparison, the SA 300 can sense when discharging (or charging) of the common net, input/output terminal 306, is generated at a sufficient level and, in response, output the pulse flag.

With reference to FIG. 4, another example embodiment of a pixel output processing circuit is shown. In this example, a pixel output processing circuit 400 is provided that has a similar configuration to the pixel output processing circuit 100 shown in FIG. 1. For brevity purposes, description is not repeated of portions of pixel output processing circuit 400 that are the same as or equivalent to like portions in pixel output processing circuit 100. As in the pixel output processing circuit 100, LRF pixels of the pixel output processing circuit 400 are grouped in individual columns, but in embodiments can be grouped, instead, in individual rows, multiple columns and/or multiple rows, or a portion of one or more rows and/or columns. The output of the grouped LRF pixels is processed, with the result being an output pulse flag that is provided to a circuit that synchronizes the pulse flag signals. The circuit that synchronizes the pulse flag signals can be configured in the same way as pixel output processing circuit 100, e.g., including the counter latch 130, the counter 150 receiving a counter reset from the laser source 104, and the processing device 170.

In the embodiment shown in FIG. 1, the grouped LRF pixels are connected together at the drain of their amplifying transistor 10 and connected to a comparator 108 (or to the input/output 306 of a respective SA, such as SA 300 shown in FIG. 3). However, in the embodiment of FIG. 4, the grouped LRF pixels are connected together at the drain of their amplifying transistor 10, with each of the common nets 106 connected to a single comparator 408 (or to the input/output 306 of a single SA, such as SA 300 shown in FIG. 3). In the example shown in FIG. 4, an OR gate (such as OR gate 118 shown in FIG. 1) is not needed to generate the pulse flag. Rather, the pulse flag can be output directly from an output terminal 414 of the comparator 408.

The comparators 108 and 408 in FIGS. 1 and 4 can represent the comparators (amplifiers) of SA 300 formed of transistors 308, 352, 354, 356, 358, and 380 of FIG. 3 that monitor the common net 106. The common net can represent the input/output terminal 306 of FIG. 3, The reference signal VREF shown in FIGS. 1 and 4 can be provided by reference amplifying transistors 20 (shown in FIG. 3) of reference pixels 206 (shown in FIG. 2). The reference signal VREF can be generated through several means, including by a reference pixel, a DAC, an external voltage supply, or an alternative voltage reference generation circuit.

Each of FIGS. 1, 3, and 4 indicate embodiments of one or more detection circuits 111. The detection circuits 111 in FIG. 1 include the comparator 108 associated with each respective column and the OR circuit 118 that receives the output of the comparators 108 and outputs the pulse flag. The detection circuit 111 shown in the embodiment of FIG. 4 includes a single comparator that is associated with all of the pixels of the pixel array. The detection circuit 111I shown in the embodiment of FIG. 3 is the sense amplifier 300, which is associated with column 0. The sense amplifier 300 includes the components shown in FIG. 3 other than the components that belong to the LRF pixels, such as amplifying transistors 10 and reference amplifying transistors 20. The sense amplifier 300 is an example sense amplifier and is not limited to the example configuration shown.

The configuration shown in FIGS. 1, 3, and 4 depict the amplifying transistors 10 and the reference amplifying transistors 20 as PMOS transistors. In embodiments, however, the amplifying transistors 10 and the reference amplifying transistors 20 can be configured as NMOS transistors, with the SA configured accordingly, as would be understood by a person having skill in the art.

The methods and systems of the present disclosure, as described above and shown in the drawings, provide for LRF pixels in which components for digitizing, comparing, or buffering signals are provided outside of the LRF pixels. The circuit for processing the analog output form the LRF pixels can provide temporal resolution in the range of several nanoseconds.

While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A pixel output processing circuit of a focal plane array (FPA), the FPA having a plurality of laser range finding (LRF) pixels, the pixel output processing circuit comprising:
   a common net connected to an amplifying transistor of each of the LRF pixels for receiving analog signals output from the respective LRF pixels, wherein the respective LRF pixels output a high frequency analog signal in response to sensing a reflected laser pulse, wherein each of the LRF pixels is included in a first subset of pixels of the FPA, and a second subset of pixels of the FPA are not coupled to the pixel output processing circuit; and
   a detection device coupled to the common net, the detection device outputting a pulse flag in response to detecting that a high frequency analog signal has been received by the common net.

2. The pixel output processing circuit of claim 1, further comprising a synchronization circuit that synchronizes the pulse flag with at least one of emission of a known timing signal and a laser pulse from a laser source.

3. The pixel output processing circuit of claim 1, wherein the detection device includes at least one of a comparator and an amplifier.

4. The pixel output processing circuit of claim 3, wherein the comparator compares a voltage associated with the common net to a voltage associated with a reference net.

5. The pixel output processing circuit of claim 1, wherein the entire detection device is external to each of the pixels.

6. The pixel output processing circuit of claim 1, wherein the detection device includes at least one voltage-mode sense amplifier.

7. The pixel output processing circuit of claim 6, wherein the at least one voltage-mode sense amplifier compares a voltage associated with the common net to a voltage associated with a reference net.

8. The pixel output processing circuit of claim 6, wherein the amplifying transistors are coupled to the voltage-mode sense amplifier as at least one of pullup or pulldown devices.

9. The pixel output processing circuit of claim 1, wherein the synchronization circuit includes a counting device that begins counting in response to notification of emission of the laser pulse from the laser source and a counter latch that saves a count value indicative of counting by the counter in response to notification of output of the pulse flag.

10. The pixel output processing circuit of claim 1, wherein a time interval between sensing the reflected laser pulse by one of the LRF pixels and outputting the pulse flag is less than 10 ns.

11. The pixel output processing circuit of claim 1, wherein a time interval between sensing the reflected laser pulse by one of the LRF pixels and outputting the pulse flag is less than 5 ns.

12. The pixel output processing circuit of claim 1, wherein a time interval between sensing the reflected laser pulse by one of the LRF pixels and outputting the pulse flag is less than 2 ns.

13. The pixel output processing circuit of claim 1, wherein timing of outputting the pulse flag is proportional to a distance between the FPA and an object off which the laser pulse sensed by the LRF pixels signal was reflected.

14. A focal plane array (FPA) comprising:
an array of laser range finding (LRF) pixels, the respective LRF pixels outputting a high frequency analog signal in response to sensing a reflected laser pulse; and
a pixel output processing circuit, the pixel output processing circuit comprising:
a common net connected to a amplifying transistor of each of the LRF pixels for receiving analog signals output from the respective LRF pixels, the respective LRF pixels outputting a high frequency analog signal in response to sensing a reflected laser pulse, wherein each of the LRF pixels is included in a first subset of pixels of the FPA, and a second subset of pixels of the FPA are not coupled to the pixel output processing circuit; and
a detection device coupled to the common net, the detection device outputting a pulse flag in response to detecting that a high frequency analog signal has been received by the common net.

15. The FPA of claim 14, wherein the pixel output processing circuit further comprises a synchronization circuit that synchronizes the pulse flag with at least one of emission of a known timing signal and a laser pulse from a laser source.

16. The FPA of claim 14, wherein the detection device includes at least one of a comparator and a sense amplifier.

17. The FPA of claim 14, wherein the entire detection device is external to each of the pixels.

18. A laser range finding (LRF) apparatus comprising:
a laser source;
a focal plane array (FPA) having an array of laser range finding pixels (LRF), the respective LRF pixels outputting a high frequency analog signal in response to sensing a reflected laser pulse;
a pixel output processing circuit comprising:
a common net connected to a amplifying transistor of each of the LRF pixels for receiving analog signals output from the respective LRF pixels, wherein each of the LRF pixels is included in a first subset of pixels of the FPA, and a second subset of pixels of the FPA are not coupled to the pixel output processing circuit; and
a detection device coupled to the common net, the detection device outputting a pulse flag in response to detecting that a high frequency analog signal has been received by the common net.

19. The LRF apparatus of claim 18, wherein the entire detection device is external to each of the pixels.

20. The FPA of claim 14, wherein the LRF pixels are multimode pixels configured to perform two or more operations of acquiring images, laser pulse detection, and LRF.

21. The FPA of claim 14, wherein the laser pulses have a wavelength in one of an infrared (NIR), short-wavelength infrared (SWIR), mid-wavelength infrared (MWIR), long-wavelength infrared (LWIR) waveband.

22. The LRF apparatus of claim 18, wherein the LRF pixels are multimode pixels configured to perform two or more operations of acquiring images, laser pulse detection, and LRF.

23. The LRF apparatus of claim 18, wherein the laser pulses have a wavelength in one of an infrared (NIR), short-wavelength infrared (SWIR), mid-wavelength infrared (MWIR), long-wavelength infrared (LWIR) waveband.

* * * * *